Aug. 16, 1949.　　　　　D. W. MACHIN　　　　　2,479,048
ATTACHMENT FOR VEHICLES FOR
HANDLING BULKY MATERIALS
Filed Oct. 16, 1946　　　　　　　　　　　　　　2 Sheets-Sheet 1
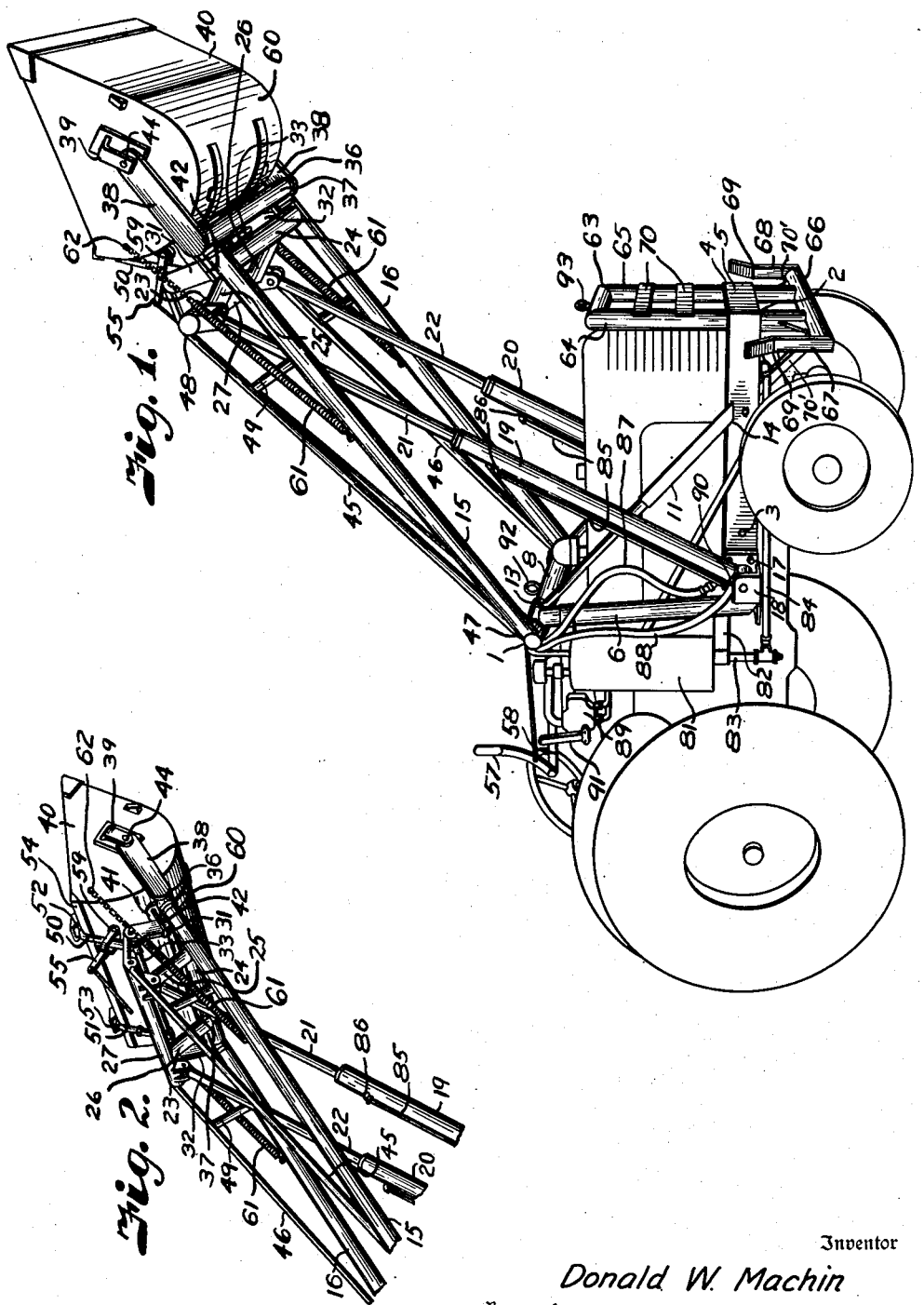
Inventor
Donald W. Machin
By Fishburn & Mullendore,
Attorneys.

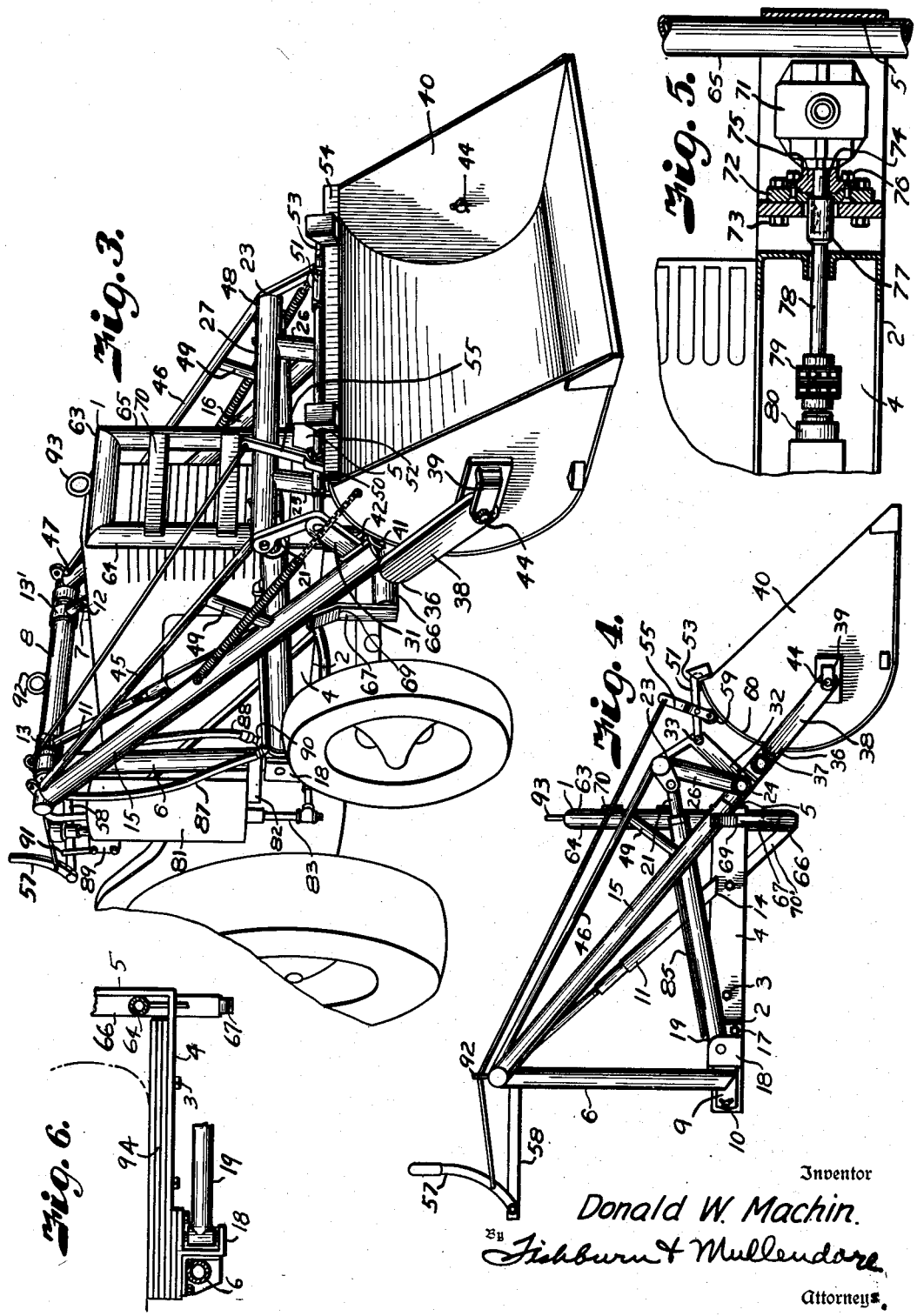

Patented Aug. 16, 1949

2,479,048

UNITED STATES PATENT OFFICE 2,479,048

ATTACHMENT FOR VEHICLES FOR HANDLING BULKY MATERIALS

Donald W. Machin, Ottawa, Kans., assignor to Ottawa Steel Products, Inc., Ottawa, Kans., a corporation of Kansas Application October 16, 1946, Serial No. 703,606

7 Claims. (Cl. 214—140)

This invention relates to improvements in power loaders of the type which includes a frame for attachment to a tractor or similar vehicle and is provided with load lifting arms pivoted on the frame and projecting forwardly of the vehicle for mounting a load carrier, such as a shovel, and which is loaded incidental to movement of the load carrier into material to be loaded therein under forward movement of the vehicle.

In apparatus of this character, the thrust of the resistance to movement by the material being loaded exerts severe strains on the load lifting arms and especially their connections with the frame.

It is, therefore, a principal object of the present invention to provide the mounting frame of the apparatus with stabilizing means for supporting the load lifting arms during loading of the carrier and maintain linear alignment of the load carrier with the vehicle and mounting frame.

Other objects of the invention are to provide a rigid tie between the stabilizing means for the respective load lifting arms and which forms a guide and also protects the forward end of the tractor vehicle and the pump carried thereby when the carrier is pushed into a pile of material to be loaded; to provide the stabilizing means for the load lifting arms in combination with a load carrier for further maintaining rigidity of the load carrier relative to the tractor; to provide protection of the forwardly mounted pump by the substantially rigid stabilizing frame or tie; and to provide the arm stabilizing means with guides for insuring registry of the arms with the stabilizing means when the load carrier is being moved from an elevated position to loading position.

In accomplishing these and other objects of the present invention I have provided improved details of structure, the preferred form of which is illustrated in the accompanying drawings wherein:

Fig. 1 is a perspective view of a load handling apparatus equipped with the present invention and showing the load lifting arms and load carrier in elevated position.

Fig. 2 is a fragmentary perspective view of the rear and side of the load carrier, particularly illustrating the connections which are ordinarily subject to disruptive stresses eliminated by the present invention.

Fig. 3 is a perspective view showing the load carrier in loading position and the lifting arms in engagement with the stabilizing means.

Fig. 4 is a side elevational view with the load carrier in the position shown in Fig. 3 and the mounting frame detached from the tractor vehicle.

Fig. 5 is a fragmentary section particularly illustrating the feature of the stabilizing means for protecting the forwardly mounted pump used in supplying fluid under pressure to the hydraulic actuators.

Fig. 6 is a fragmentary sectional view showing the spacer plates for the frame to adjust the frame to different size tractors.

Referring more in detail to the drawings:

1 designates a loader attachment for a tractor or other vehicle that includes a frame 2 adapted to be secured to the tractor frame by fastening devices 3, and which has a crank shaft 80 connected at its forward end by a universal coupling 79 with an extension shaft 78 that projects forwardly of the vehicle.

The frame illustrated comprises a U-shaped member having spaced side rails 4 adapted to extend alongside the tractor frame, and supports the connecting member 5 in spaced relation with the forward end of the tractor frame. The rear of the frame is shown as terminating at substantially the mid-point of the tractor vehicle, and carries uprights 6 and 7. The uprights 6 and 7 are connected at their upper ends by a cross member 8 that extends across the tractor vehicle in forming a gantry. The lower ends of the uprights are secured to bracket arms 9 which are adjustably mounted on the side rails 4 of the framework by a bolt 10. The uprights 6 and 7 are further supported by adjustable braces 11 and 12 having their upper ends secured to collars 13 and 13' rotatably supported on the cross member and their forward ends secured to the side rail 4 of the U-shaped member as indicated at 14 (Fig. 4), so that when the gantry is moved forwardly or backwardly there will not be any tendency of the braces 11 and 12 to bind upon adjustment thereof. The cross bar 8 extends outwardly from the upright posts 6 and 7 and pivotally mounted thereon are load lifting arms 15 and 16 having their forward ends extending forwardly of the tractor vehicle.

Secured to the side rails 4 of the framework structure forwardly of the uprights 6 and 7 by bolts or the like 17 are brackets 18 to which are pivotally attached hydraulic cylinders or rams 19 and 20. The hydraulic rams are arranged to extend alongside the tractor frame and are provided with plungers 21 and 22 having their forward ends pivotally attached to a load carrier frame mounted on the forward ends of the arms 15 and 16.

The load lifting arms are connected by a framework comprising a rigid cross member 24 and secured thereto are arms 25 and 26. Secured to the arms are upright arms connected at their upper ends by a cross member 27 connected with the forward ends of the lifting arms by arms 31 and 32. Connected with the upper ends of the upwardly extending arms is a rod or the like 33.

The shovel or bucket of the load carrier as illustrated and described in my co-pending application, Serial No. 676,991, filed June 15, 1946, now Patent No. 2,436,723 granted Feb. 24, 1948, is rigidly carried by the forward ends of the load lifting arms 15 and 16 by a yoke 36 comprising a cross bar 37 and forwardly extending arms 38 between which arms by suitable brackets or the like 39 is carried the material lifting bucket 40. Extending rearwardly of the cross bar 37 and rigidly secured thereto are arms adapted to extend in the forward ends of the tubular load lifting arms 15 and 16. The cross arm 24 is also provided with upstanding lugs 41 near the respective ends thereof adapted to receive the free ends of U-shaped loop members 42 adapted to engage the upright arms 31 and 32 to retain the yoke member securely on the forward ends of the load lifting arms and provide for removal thereof when desired. The bracket members 39 on the respective ends of the material carrying means 40 are provided with pins 44 for pivotally securing the bucket to the arms 38 of the yoke member.

Radius rods 45 and 46 have their rear ends rigidly secured to the rear portion of the load lifting arms as indicated at 47 (Fig. 3) and their forward ends rigidly secured to the cross bar 27 as indicated at 48. Truss rods 49 extend between the load lifting arms 15 and 16 and the radius rods 45 and 46.

Secured to the rod 33 intermediate its ends thereof are forwardly extending rods 50 and 51. Secured to the forward ends of the rods 50 and 51 are latching members 52 and 53 adapted to engage over the rim 54 of the material carrying bucket 40. A lever arm 55 is pivotally secured to the forwardly extending rod 51 to which is attached a lever, rod or the like 56 extending to a lever 57 carried by an arm 58 on the tractor frame for manipulating the lever 55 as later described. The lower end of the lever 55 extends below the arm 51 and is provided with a roller 59 adapted to engage the rounded rear portion 60 of the material carrying means 40 so that when the lever arm 55 is moved rearwardly the roller will move upwardly on the rounded face 60 and disengage the latching members 52 and 53 from the rim 54 of the material carrying means 40, allowing it to pivot on the yoke arms 38 to dump the material therefrom. Springs 61 are provided having connection with sides of the material carrying bucket 40 as indicated at 62 (Fig. 3) by chains or other suitable means and having their rear ends secured substantially midway of the load lifting arms 15 and 16 so that when the material is released from the load carrying bucket 40, the springs will urge the bucket back to loading position and in latched condition with the latches 52 and 53.

A frame 63 is adapted to be rigidly secured within the frame 4, the side bars 64 and 65 of which extend below the frame 63. Rigidly secured to the lower ends of said side members 64 and 65 is a cross arm 66 having upstanding arms 67 and 68 rigidly secured to the respective ends thereof and having their upper ends curved outwardly as indicated at 69 (Fig. 1) to provide a keeper for the load lifting arms when they are in load filling position, the load lifting arms being adapted to engage within the upwardly extending arms 67 and 68 to prevent sidewise movement of the arms due to strains and stresses on the material carrying bucket 40 during the filling operation. Cross bars 70 are provided on the outer side of the member 63 to better protect the front end of the tractor, and bracing bars or rods 70' are connected between the side rails 4 of the frame and the cross arm 66. If desired these braces may be secured to the lower ends of upstanding posts 64 and 65 to lend rigidity to the structure.

I provide a pump 71 supported on the tractor frame by brackets 72 by bolts or the like 73. A shaft 74 extends through a bushing 75 secured to the bracket members by bolts or the like 76 and engages within a connecting collar 77 on the end of the extension shaft 78 having a universal joint connection 79 with the crank shaft 80 of the tractor, also as disclosed in my co-pending application.

A fluid tank 81 is suitably secured to the loader by brackets or the like 82. A fluid line 83 extends from the lower end of the tank 81 which connects with a line 84 leading to the pump 71. Lines 85 having one end connected to the forward ends of the cylinders as indicated at 86 (Fig. 2) are connected with a flexible line 87 leading to the supply tank 81. A fluid line 88 having one end connected to a control valve 89 connects to the rear end of the hydraulic cylinders as indicated at 90 for supply of fluid to the cylinders upon manipulation of the lever 91 on the control valve. A ring 92 is rigidly secured to the cross bar 8 above the uprights 6 and 7 and a ring 93 also secured to the member 63 for connection of power lifting means (not shown) for attaching and detaching the load lifting device from the tractor.

Fig. 6 illustrates the adjustable feature of the frame 2 to fit tractors of different width. 94 designates spacer plates adapted to be secured to the side rails 4 of the frame between the rails and the frame of the tractor. While I have here shown three spacer plates, any desired number may be used and other forms of plates may be used without departing from the spirit of the present invention.

Operation of a device constructed and assembled as described is as follows:

The loader is attached to the tractor by placing the framework over the frame of the tractor and the side rails fastened to the body by the bolt 3. The uprights 6 and 7 may be adjusted to the proper position forwardly or rearwardly by adjustment of the bracing rods 12 and 13 and by adjustment of the bolt 10 to pivot the bracket 9 with respect to the framework structure. With this arrangement the forward ends of the loader may be lowered or raised to suit the convenience of the user. Lowering of the forward end is very desirable when moving material below the surface of the ground and below the front wheels of the tractor.

Release of fluid in the cylinders 19 and 20 behind the plungers 21 and 22 will cause lowering of the load lifting means to load filling position. Forward movement of the tractor will load the load lifting means or bucket 40 with whatever material is desired and pressure on the fluid to cause it to flow to the cylinders will cause the plungers to be moved forwardly in the cylinders to raise the load carrying bucket and be guided upwardly by the load lifting arms and radius members to the desired elevation so that the load may be deposited where desired. Manipulation of the lever 57 rearwardly will cause the lever arm 55 and the roller 60 on the lower end thereof to raise the rods 50 and 51, thus releasing the latches 52 and 53 from the rim 54 of the bucket 40 to cause dumping of the material therein. The springs 61 will then cause the bucket to be raised to load filling position in latching contact with the latching members 52 and 53. The pump 72 will cause pressure on the fluid in the tank 81 to supply fluid to the cylinders 19 and 20 and bleeding of the fluid from the cylinders as the pressure is released will cause the fluid to flow back through lines 87 to the tank.

I do not wish to be limited to any particular load lifting means as buckets and other material carrying means may be adapted for my purpose.

Upon lowering of the load lifting arms the forward ends thereof will be engaged in the upstanding bracket arms 67 and 68 on the forward end of the tractor frame to p... movement of the load lifting means whe... load lifting bucket is being filled.

It will be obvious from the foregoing that I have provided an improved loading attachment for tractors which may be quickly and easily attached to and detached from a tractor or vehicle and which is particularly adapted for industrial purposes for the moving of heavy materials.

What I claim and desire to secure by Letters Patent is:

1. In a vehicle mounted apparatus for moving heavy materials, a frame adapted for attachment to a vehicle, an adjustable gantry forming a part of said frame, load lifting arms pivotally mounted on said gantry and extending forwardly of said frame, a cross bar connecting the forward ends of the load lifting arms and having vertical arms and an upper cross member load carrying means carried on the forward ends of said load lifting arms, hydraulic actuators pivotally mounted to a lower portion of said frame and with the upper cross member on the load lifting arms for raising and lowering said load lifting arms, and the combination of means on said frame for preventing lateral movement of said load lifting arms and load carrying means when the load carrying means is in loading position.

2. In a vehicle mounted apparatus for moving heavy materials, a frame adapted for attachment to a vehicle, a gantry forming a part of said frame, said gantry having adjustable braces connected to its upper portion and to said frame to adjust position of the gantry relative to said frame, said frame including side rails extending forwardly of the vehicle load lifting arms pivotally mounted on said gantry and extending forwardly of said frame, load carrying means carried on the forward ends of said lifting arms, hydraulic actuators pivotally mounted to a lower portion of said frame and with the forward ends of the load lifting arms for raising and lowering said load lifting arms, and the combination of means on said frame for preventing lateral movement of said load lifting arms and load carrying means when the load carrying means is in loading position.

3. In a vehicle mounted apparatus for moving heavy materials, a frame adapted for attachment to a vehicle, a gantry forming a part of said frame, said frame including side rails extending forwardly of the vehicle load lifting arms pivotally mounted on said gantry and extending forwardly of said frame, load carrying means carried on the forward ends of said lifting arms, hydraulic actuators pivotally mounted to a lower portion of said frame and with the forward ends of the load lifting arms for raising and lowering said load lifting arms, and the combination of a frame and upstanding arms spaced from said frame on the forward end of said frame for preventing lateral movement of said load lifting arms and load carrying means when the load carrying means is in loading position.

4. A front end attachment for tractors or the like comprising, a frame removably attached to the frame of said tractor, said frame including a gantry and side rails extending forwardly of said tractor frame, load lifting arms pivotally mounted on said gantry and extending forwardly of the vehicle, hydraulic cylinders pivotally mounted to the lower rear portion of said frame, said cylinders having plungers adapted for sliding movement therein and having their forward ends pivotally connected to said load lifting arms, guide means on the forward end of said frame, said means including a frame, a cross arm on the lower end of the frame and vertical arms on the outer end of the cross arm for engaging said load lifting arms when they are in loading position to prevent lateral movement thereof, material carrying means carried by said load lifting arms, and means for supplying fluid under pressure to said cylinders, whereby the forward ends of said load lifting arms will be elevated as the plungers are extended forwardly.

5. A front end attachment for tractors or the like comprising, a frame removably attached to the frame of said tractor, said frame including a gantry and side rails extending forwardly of said tractor frame, load lifting arms pivotally mounted on said gantry and extending forwardly of the vehicle, a framework connecting the forward ends of the load lifting arms adjustable bracing means attached to said gantry and to said side rails, hydraulic cylinders pivotally mounted to the lower rear portion of said frame, said cylinders having plungers adapted for sliding movement therein and having their forward ends pivotally connected to said framework, material carrying means pivotally carried by the forward ends of the load lifting arms, means for supplying fluid under pressure to said cylinders, whereby the forward ends of said load lifting arms will be elevated as the plungers are extended forwardly, and means including a lever having a roller engaging the material carrying means for releasing said latching means from said material carrying means.

6. A front end attachment for tractors or the like comprising, a frame removably attached to the frame of said tractor, said frame including a gantry and side rails extending forwardly of said tractor frame, guide means rigidly secured to the forward end of said frame, load lifting arms pivotally mounted on said gantry and extending forwardly of the vehicle, a framework structure rigidly connecting the forward ends of the load lifting arm, hydraulic cylinders pivotally mounted to the lower rear portion of said frame, said cylinders having plungers adapted for sliding movement therein and having their forward ends pivotally connected to said load lifting arms and said framework structure being adapted to engage the inner sides of said upstanding arms when the cylinders are in lowered position, material carrying means mounted on said load lifting arms, latching means on said framework structure carried by said load lifting arms for holding said material carrying means in locked position, means for supplying fluid under pressure to said cylinders, whereby the forward ends of said load lifting arms will be elevated as the plungers are extended forwardly, and means including a lever having a roller engaging the material carrying means for releasing said latching means from said material carrying means.

7. A front end attachment for tractors or the like comprising, a frame removably attached to the frame of said tractor, said frame including a gantry and side rails extending forwardly of said tractor frame, guide means secured to the forward end of said frame, said means including upstanding arms outwardly of the frame, load lifting arms pivotally mounted on said gantry and extending forwardly of the vehicle, a framework structure rigidly connecting the forward ends of the load lifting arm, hydraulic cylinders pivotally mounted to the lower rear portion of said frame, said cylinders having plungers adapted for sliding movement therein and having their forward ends pivotally connected to said load lifting arms and said framework structure being adapted to engage the inner sides of said upstanding arms when the cylinders are in lowered position, material carrying means mounted on said load lifting arms, latching means carried by said load lifting arms for holding said material carrying means in locked position, means for supplying fluid under pressure to said cylinders, whereby the forward ends of said load lifting arms will be elevated as the plungers are extended forwardly, means including a lever having a roller engaging the material carrying means for releasing said latching means from said material carrying means, and means for returning the material carrying means to locked position.

DONALD W. MACHIN.

REFERENCES CITED

The following references are of record in the file of this patent:

UNITED STATES PATENTS

| Number | Name | Date |
|---|---|---|
| 2,306,313 | Johnson | Dec. 22, 1942 |
| 2,319,921 | Dooley et al. | May 25, 1943 |
| 2,391,857 | Arps et al. | Jan. 1, 1946 |
| 2,417,021 | Simmonds | Mar. 4, 1947 |
| 2,417,544 | Coleman | Mar. 18, 1947 |
| 2,426,544 | Wooldridge | Aug. 26, 1947 |